(12) United States Patent
Palanki et al.

(10) Patent No.: US 7,860,149 B2
(45) Date of Patent: Dec. 28, 2010

(54) METHODS AND APPARATUS FOR FLEXIBLE HOPPING IN A MULTIPLE-ACCESS COMMUNICATION NETWORK

(75) Inventors: Ravi Palanki, San Diego, CA (US);
Aamod Khandekar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 743 days.

(21) Appl. No.: 11/317,413

(22) Filed: Dec. 22, 2005

(65) Prior Publication Data

US 2007/0160115 A1 Jul. 12, 2007

Related U.S. Application Data

(60) Provisional application No. 60/638,469, filed on Dec. 22, 2004.

(51) Int. Cl.
H04B 1/00 (2006.01)
(52) U.S. Cl. .................. 375/135; 375/132; 375/133; 375/136
(58) Field of Classification Search ............. 375/132, 375/133, 135, 136, 259, 260, 267
See application file for complete search history.

(56) References Cited

U.S. PATENT DOCUMENTS

| | | | |
|---|---|---|---|
| 6,041,046 A | 3/2000 | Scott et al. | |
| 6,292,494 B1 * | 9/2001 | Baker et al. | 370/459 |
| 6,529,487 B1 * | 3/2003 | Rose | 370/328 |
| 6,920,171 B2 * | 7/2005 | Souissi et al. | 375/133 |
| 6,981,157 B2 * | 12/2005 | Jakobsson et al. | 713/165 |
| 7,039,370 B2 * | 5/2006 | Laroia et al. | 455/101 |
| 7,486,735 B2 | 2/2009 | Dubuc et al. | |
| 2004/0190640 A1 * | 9/2004 | Dubuc et al. | 375/260 |
| 2005/0128953 A1 | 6/2005 | Wallace et al. | |
| 2005/0165949 A1 | 7/2005 | Teague | |
| 2005/0286663 A1 | 12/2005 | Poon | |
| 2006/0072649 A1 * | 4/2006 | Chang et al. | 375/132 |
| 2007/0071147 A1 | 3/2007 | Sampath et al. | |
| 2007/0174038 A1 | 7/2007 | Wang et al. | |
| 2008/0187062 A1 | 8/2008 | Pan et al. | |

FOREIGN PATENT DOCUMENTS

| | | |
|---|---|---|
| EP | 1973284 | 9/2008 |
| EP | 2034682 | 3/2009 |
| WO | 0011817 | 3/2000 |
| WO | 0051304 | 8/2000 |

(Continued)

OTHER PUBLICATIONS

Written Opinion—PCT/US2005/046743—European Patent Office, Munich—May 24, 2006.

(Continued)

*Primary Examiner*—David B Lugo
(74) *Attorney, Agent, or Firm*—Dmitry R. Milikovsky; Stanton Braden

(57) ABSTRACT

Techniques for efficiently designing random hopping patterns in a communications system are disclosed. The disclosed embodiments provide for methods and systems for generating random hopping patterns, updating the patterns frequently, generating different patterns for different cells/sectors, and generating patterns of nearby sub-carriers for block hopping.

34 Claims, 7 Drawing Sheets

FOREIGN PATENT DOCUMENTS

| WO | 0193479 | 12/2001 |
| WO | 03001761 | 1/2003 |
| WO | 2004032443 | 4/2004 |
| WO | 2004077777 | 9/2004 |
| WO | 2004102815 | 11/2004 |
| WO | 2007050861 | 5/2007 |

OTHER PUBLICATIONS

International Preliminary Report on Patentability—PCT/US2005/046743—The International Bureau of WIPO, Geneva, Switzerland—Jun. 26, 2007.

Jim Tomcik, QFDD and QTDD: Technology Overview, IEEE 802.20 Working Group on Mobile Broadband Wireless Access, Oct. 28, 2005, pp. 48-50, UR., http://www.ieee802.org/20/contribs/C802.20-05-68.zip.

QUALCOMM Incorporated: "QFDD Technology Overview Presentation," IEEE 802.20 Working Group on Mobile Broadband Wireless Access, [Online] No. C802.20-05-59, XP002518168 [Retrieved from the Internet: URL:http://grouper.ieee.org/groups/, Nov. 2005.

* cited by examiner

US 7,860,149 B2

METHODS AND APPARATUS FOR FLEXIBLE HOPPING IN A MULTIPLE-ACCESS COMMUNICATION NETWORK

CROSS-REFERENCE TO RELATED APPLICATIONS

This application claims benefit under 35 U.S.C. § 119(e) from U.S. Provisional Patent application Ser. No. 60/638,469 entitled "Methods and Apparatus for Flexible Hopping in a Multiple-Access Communication Network" and filed Dec. 22, 2004, the entirety of which is hereby incorporated by reference.

BACKGROUND

I. Field

The present invention relates generally to communications, and more specifically to techniques for generating flexible hopping patterns in a multiple-access communication network.

II. Background

Communication systems are widely deployed to provide various communication services such as voice, packet data, and so on. These systems may be time, frequency, and/or code division multiple-access systems capable of supporting communication with multiple users simultaneously by sharing the available system resources. Examples of such multiple-access systems include Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

A communication system may employ a hopping scheme to improve interference. There is therefore a need in the art for techniques to efficiently design random hopping patterns in a communication network.

SUMMARY

Techniques for efficiently designing random hopping patterns in a communications system are disclosed. The disclosed embodiments provide for methods and systems for generating random hopping patterns, updating the patterns frequently, generating different patterns for different cells/sectors, and generating patterns of nearby frequency subcarriers for block hopping.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein is "exemplary" and is not necessarily to be construed as preferred or advantageous over other embodiments or designs.

Figure 1:
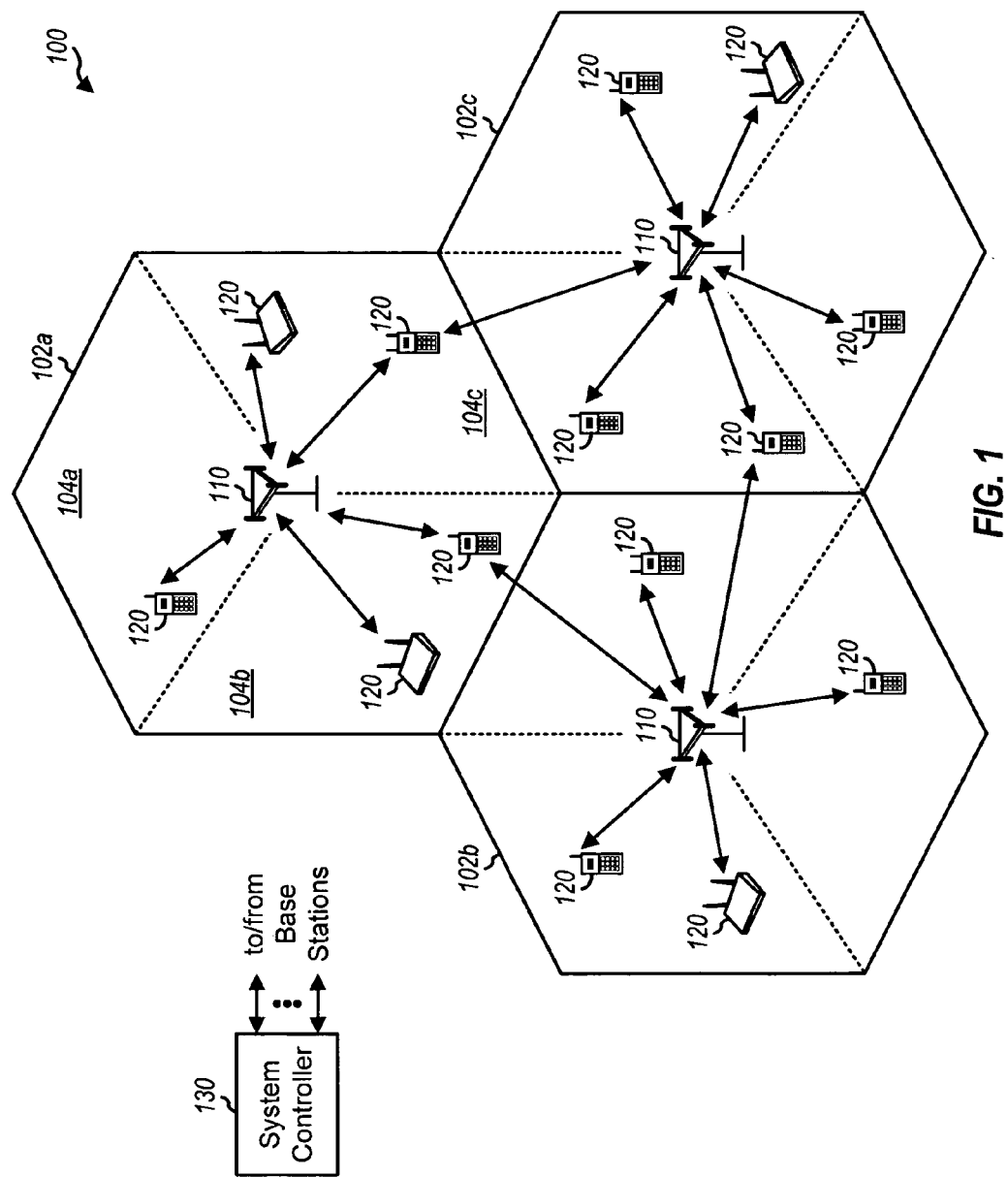
FIG. 1 depicts a wireless access network according to one embodiment.

FIG. 1 shows a wireless communication system 100 with multiple base stations 110 and multiple terminals 120. A base station is a station that communicates with the terminals. A base station may also be called, and may contain some or all of the functionality of, an access point, a Node B, and/or some other network entity. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a BTS that serves a sector as well as a base station that serves a cell.

Terminals 120 are typically dispersed throughout the system, and each terminal may be fixed or mobile. A terminal may also be called, and may contain some or all of the functionality of, a mobile station, a user equipment, and/or some other device. A terminal may be a wireless device, a cellular phone, a personal digital assistant (PDA), a wireless modem card, and so on. Each terminal may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for these base stations. For a distributed architecture, the base stations may communicate with one another as needed.

Figure 2:
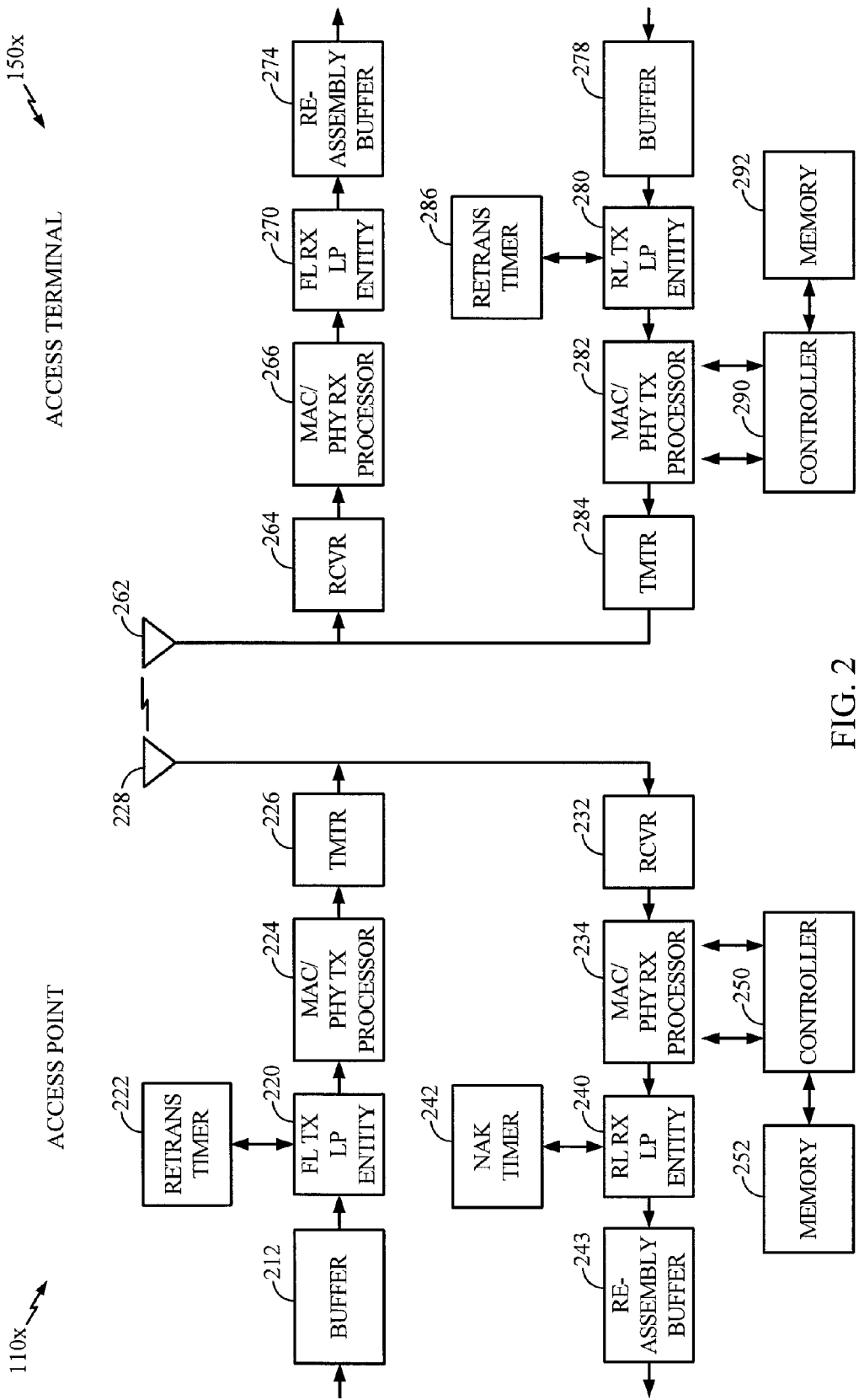
FIG. 2 depicts a block diagram of a wireless access network according to one embodiment.
Figure 3:
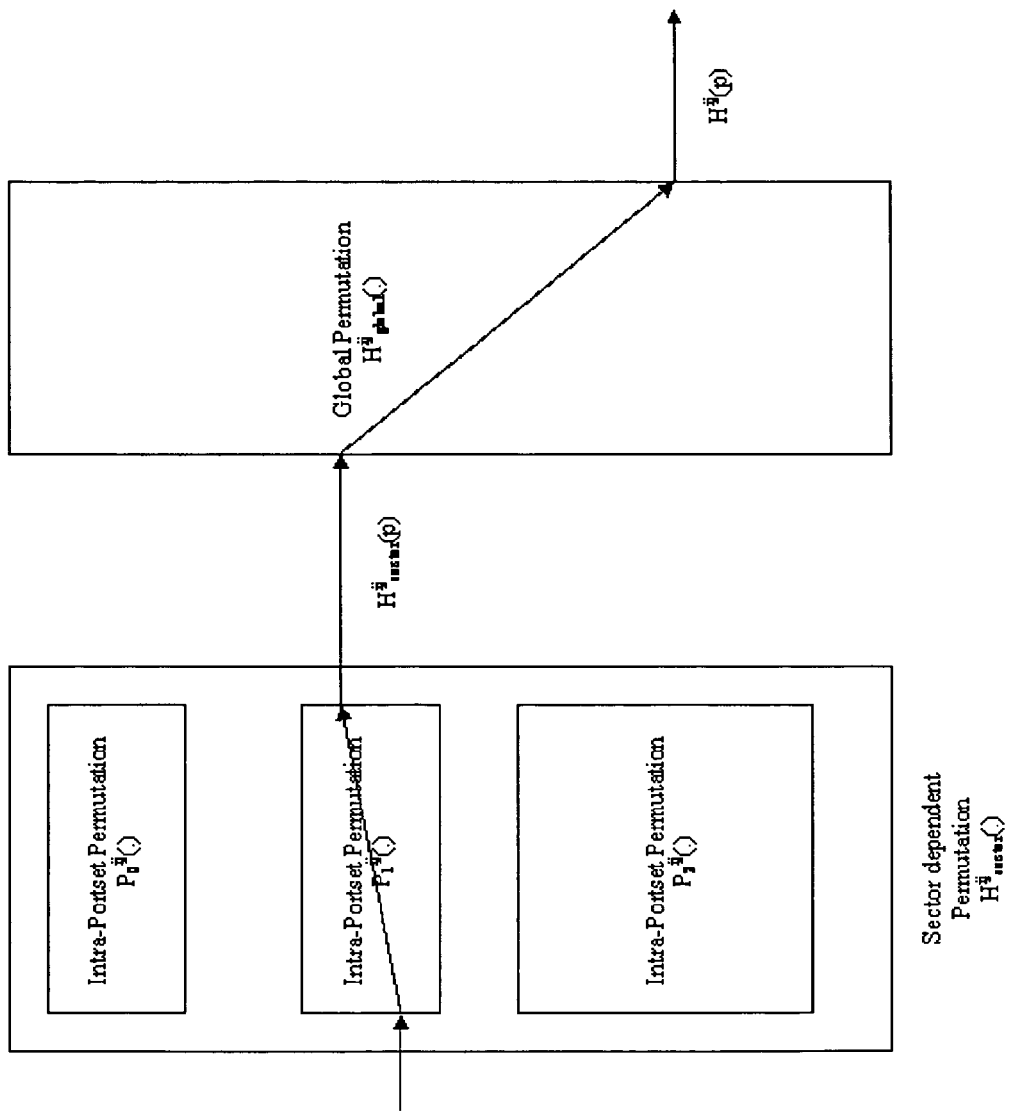
FIG. 3 shows one embodiment for generating Hop Permutation.

FIG. 2 shows a block diagram of an embodiment of an access point 110x and an access terminal 150x, which embody an access point and an access terminal, respectively, in wireless network 100 in FIG. 1. An FL facilitates data transmission from access point 110x to access terminal 150x. An RL facilitates data transmission from access terminal 150x to access point 110x.

For forward link data transmission, at access point 110x, a buffer 212 receives and stores data packets from higher layer applications. An FL TX LP entity 220 performs processing on the data packets in buffer 212 and provides a frame sequence containing frames. A MAC/PHY TX processor 224 performs forward link MAC and physical layer processing (e.g., multiplexing, encoding, modulation, scrambling, channelization, and so on) on the frame sequence from entity 220 and provides a stream of data samples. A transmitter unit (TMTR) 226 processes (e.g., converts to analog, amplifies, filters, and frequency up converts) the data sample stream from processor 224 and generates a forward link signal, which is transmitted via an antenna 228.

At access terminal 150x, the forward link signal from access point 110x is received by antenna 262 and processed (e.g., filtered, amplified, frequency downconverted, and digitized) by a receiver unit (RCVR) 264 to obtain received samples. A MAC/PHY RX processor 266 performs forward link MAC and physical layer processing (e.g., dechannelization, descrambling, demodulation, decoding, demultiplexing, and so on) on the received samples and provides a received frame sequence. An FL RX LP entity 270 performs receiver processing on the received frame sequence and provides decoded data to a re-assembly buffer 274. FL RX LP entity 270 may also generate NACKs for data detected to be missing and may also generate ACKs for data correctly decoded. The NACKs and ACKs are sent via the reverse link to access point 110x and provided to FL TX LP entity 220, which performs retransmission of the missing data if any. A retransmit timer 222 facilitates retransmission of the last frame to flush out the buffer. A NACK timer 242 facilitates retransmission of NACKs. These timers are described below.

For reverse link data transmission, at access terminal 150x, a buffer 278 receives and stores data packets from higher layer applications. An RL TX LP entity 280 performs processing on the data packets in buffer 278 and provides a frame sequence containing frames. A MAC/PHY TX processor 282 performs reverse link MAC and physical layer processing on the frame sequence from entity 280 and provides a stream of data samples. A transmitter unit (TMTR) 284 processes the data sample stream from processor 282 and generates a reverse link signal, which is transmitted via antenna 262.

At access point 110x, the reverse link signal from access terminal 150x is received by antenna 228 and processed by a receiver unit (RCVR) 232 to obtain received samples. A MAC/PHY RX processor 234 performs reverse link MAC and physical layer processing on the received samples and provides received frame sequence. An RL RX LP entity 240 performs receiver processing on the received frame sequence and provides decoded data to a re-assembly buffer 243. FL RX LP entity 240 may also generate NACKs for data detected to be missing and may also generate ACKs for data correctly decoded. The NACKs and ACKs are sent via the forward link to access terminal 150x and provided to RL TX LP entity 280, which performs retransmission of the missing data if any. The FL and RL are described in detail below. In general, ACK and/or NACK feedback may be sent by a link protocol (LP), and ACK and/or NACK feedback may also be sent by the physical layer. Controllers 250 and 290 direct operation at access point 110x and access terminal 150x, respectively. Memory units 252 and 292 store program codes and data used by controllers 250 and 290, respectively, for implementing the disclosed embodiments.

Access point 110x may transmit data to one or multiple access terminals simultaneously on the forward link. Access terminal 150x may transmit the same data to one or multiple access points on the reverse link. The following description is for forward link data transmission from access point 110x to access terminal 150x and for reverse link data transmission from access terminal 150x to access point 110x.

The hop permutation may be used to map a set of hop ports to a set of sub-carriers. In one embodiment, the hop-ports, which may be indexed from NFFT-NGUARD to NFFT-1, may be mapped to a set of guard carriers by the hop permutation. The individual elements of this mapping may not be specified if these carriers are not modulated. The hopping sequence may be described as a mapping from the set of hop-ports numbered 0 to NFFT-NGUARD-1 to the set of usable sub-carriers, e.g., all but the set of guard sub-carriers.

Let Hij(p) be the sub-carrier index corresponding to hop-port index "p" for the jth modulation symbol in superframe index "i". Here, p is an index between 0 and NFFT-NGUARD-1, and j is an integer larger than 4. There may be no hop permutation defined for symbols in the superframe preamble. Hij(p) is a value between NGUARD/2 and NFFT-NGUARD/2-1, and it may be computed according to the procedure:

Hij(p)=NGUARD/2+HijGLOBAL(HijSECTOR(p))

where HijGLOBAL(.) and HijSECTOR(.) are permutations of the set {0, 1, 2, . . . , NFFT-NGUARD-1}.

HijGLOBAL(.) is a permutation that may not depend on SECTOR_PN_OFFSET, while HijSECTOR(.) is a permutation that may depend on SECTOR_PN_OFFSET. HijGLOBAL may be the same for two sectors with the same values of FLSectorHopSeed. HijSECTOR may be different for different sectors unless the variable FLIntraCellCommonHopping is set. Furthermore, HijSECTOR(.) maps hop ports within a portset to hop ports within that portset. The number of portsets and their sizes are determined from the channel tree, which may be determined by the FTC MAC protocol.

Let there be K port sets numbered 0, 1, . . . , K-1. Let the number of hop ports in the kth port set be Nk, excluding hop-ports in the guard region. If there is only one port set, numbered 0, then N0=NFFT-NGUARD. The sector dependent permutation HijSECTOR(.) may map hop ports in the 0th port set i.e., hop ports numbered {0, 1, 2, . . . , N0-1} to numbers in the same set. This mapping is denoted as P0ij(.). Thus HijSECTOR(p)=P0ij(p) if p is in the zeroth hop port set. Similarly, the sector dependent permutation may map hop ports in the 1st port set i.e., hop ports numbered {N0, N0+1, N0+2, . . . , N0+N1-1} to numbers in the same set. This is done using a permutation on {0, 1, 2, . . . , N1-1} denoted as P1ij(.). Thus, HijSECTOR(p)=N0+P1ij(p-N0) if p is in the first port set. Similarly, HijSECTOR(p)=N0+N1+P2ij(p-N0-N1) if p is in the second port set. Thus HijSECTOR(.) is defined by a total of K intra-port set permutations P0ij(.), P1ij(.), . . . , PK-1ij(.).

According to one embodiment, one element in the generation of the hopping sequence is a Feistel network. A three-stage Feistel network generates pseudo-random permutations of sizes which are powers of 2. A Feistel network that generates a permutation π(x) of {0, 1, 2, . . . , 2n-2, 2n-1} operates as follows:

1. The n-bit input x is split into two parts (L,R) with each part containing roughly the same number of bits. If n is even, L may be the n/2 MSBs of x, and R may be the n/2 LSBs. If n is odd, L may be the (n-1)/2 MSBs of x and R may be the (n+1)/2 LSBs of x.

2. The output π1 (x) of the first stage of the Feistel network is an n-bit quantity of the form (R, L ☐f(R)). Here f(R)= (R+S1) mod 2|L| where |L| is the number of bits in L, S1 is a |L|-bit seed and ☐ is a bit-by-bit XOR operation. Seeds may be generated based on system time, sector_ID, Cell_ID, and/or sector PN-offset.

3. The output π1 (x) is fed to the next stage of the Feistel network, which may be identical to the first stage except the seed used is S2. The outputs π2(π1(x)) of the second stage is fed to the third stage, which may be identical to the first two stages, except that the seed used is S3. The output π3(π2(π1(x))) of the third stage is the final output π(x).

Figure 4:
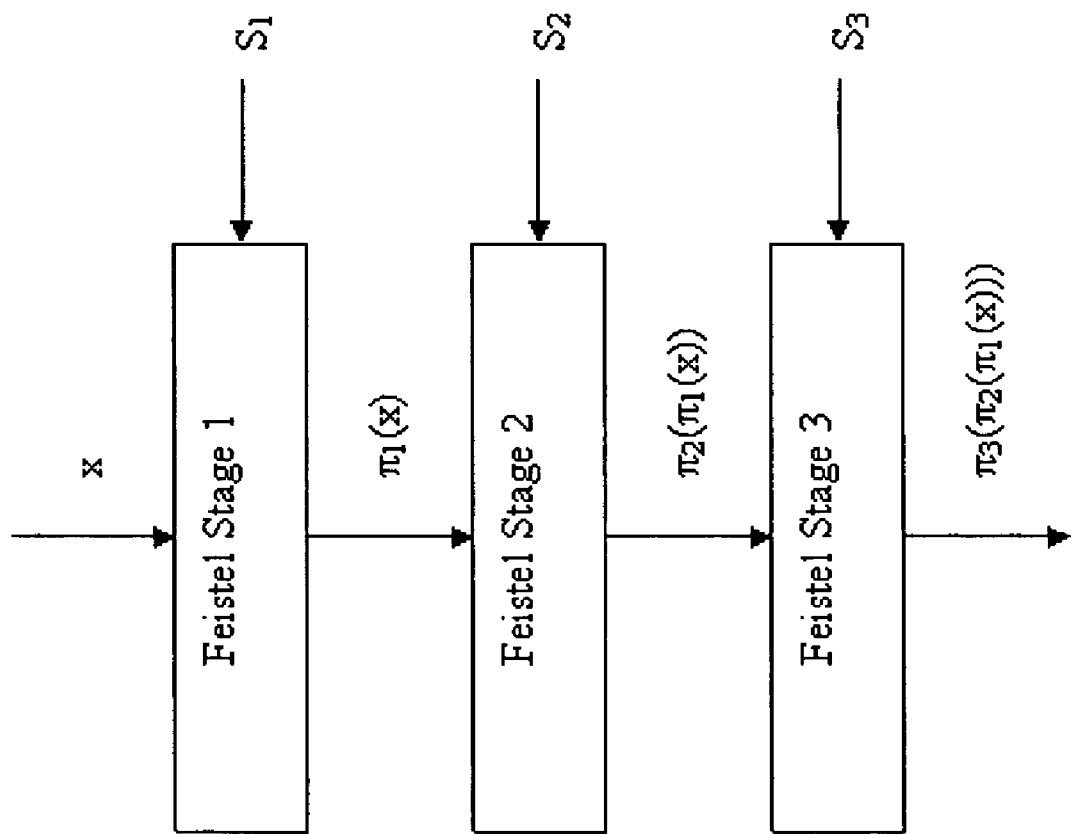
FIG. 4 shows a Feistel Network.
Figure 5:
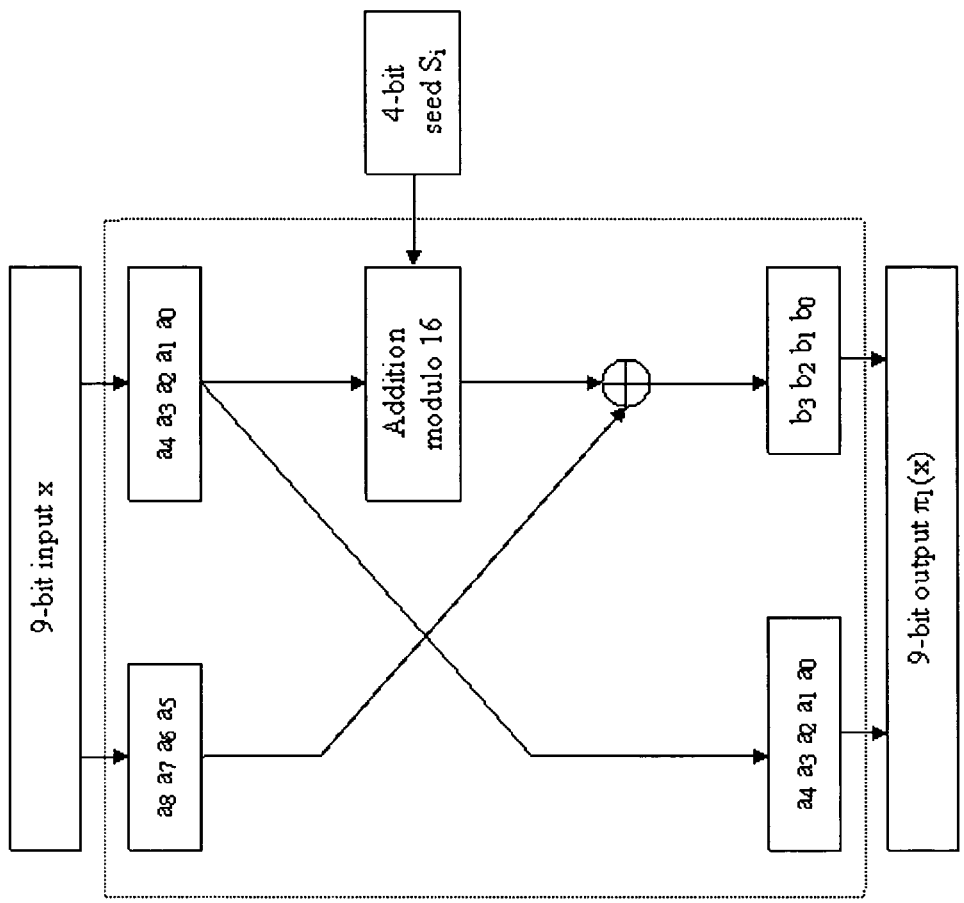
FIG. 5 shows a Single Stage in the Feistel Network of FIG. 4.

FIG. 4 shows a three-stage Feistel network. FIG. 5 shows a single Feistel stage for the case n=9. According to one embodiment, the global permutation Hijglobal(.) to be used at the jth symbol in superframe i may be generated from an initial permutation HiGLOBAL(.) as follows:

1.   HijGLOBAL(x)=HiGLOBAL(j+HiGLOBAL(j+x))
     where both the additions may be done modulo (NFFT-NGUARD). The initial permutation HiGLOBAL(.) may be generated according to the following procedure:

2. Find the smallest integer n such that NFFT≦2n. Set |L|=n/2 if n is even and (n−1)/2 if n is odd.
3. Set the Feistel seeds S1, S2 and S3 as follows:
4. Find S'=[(FLSectorHopSeed*4096+(i mod 4096))*2654435761] mod 232. Set S to be the bit-reversed value of S' in a 32-bit representation.
5. Set S1 to be the |L| LSBs of S, S2 to be the second |L| LSBs of S, and S3 to be the third |L| LSBs of S. In other words, S1=S mod 2|L|, S2=(S−S1)/2|L| mod 2|L| and S3=(S−S1−S22|L|)/22|L| mod 2|L|.
6. Initialize two counters x and y to 0.
7. Find the output π(x) of the Feistel network seeded with S1, S2 and S3. If π(x) is less than (NFFT−NGUARD), set Higlobal(y)=π(x) and increment y by 1. Increment the counter x by 1. If x<NFFT, repeat steps 4 through 6, else stop.

The generation of HijSECTOR may be described separately for different values of "FLIntraCellCommonHopping." If FLIntraCellCommonHopping is Off, the K intra-portset permutations Pkij(.) that make up HijSECTOR(.) may be generated from initial permutations Pki(.) according to the following procedure Pkij(x)=Pki(αj+Pki (βj+x)), where both the additions are performed modulo Nk. αj and βj are 9-bit random numbers generated using a PN-register with generator polynomial h(D)=D18+D11+1. The numbers αj and βj are generated as follows:
  1. The SECTOR_PN_OFFSET is XORed with the 12 LSBs of the superframe index i to obtain a 12-bit number [b11 b10 b9 b8 b7 b6 b5 b4 b3 b2 b1 b0] denoted as Boff.
  2. The PN-register is initialized to [111111 b11 b10 b9 b8 b7 b6 b5 b4 b3 b2 b1 b0] at the beginning of the superframe.
  3. The register is then clocked 18 times every symbol. The contents of the register before symbol j determine αj and βj, with αj being set to the 9 MSBs of the register and βj being set to the 9 LSBs of the register. (Thus α0=[111111 b11 b10 b9] and β0=[b8 b7 b6 b5 b4 b3 b2 b1 b0]).

Figure 6:
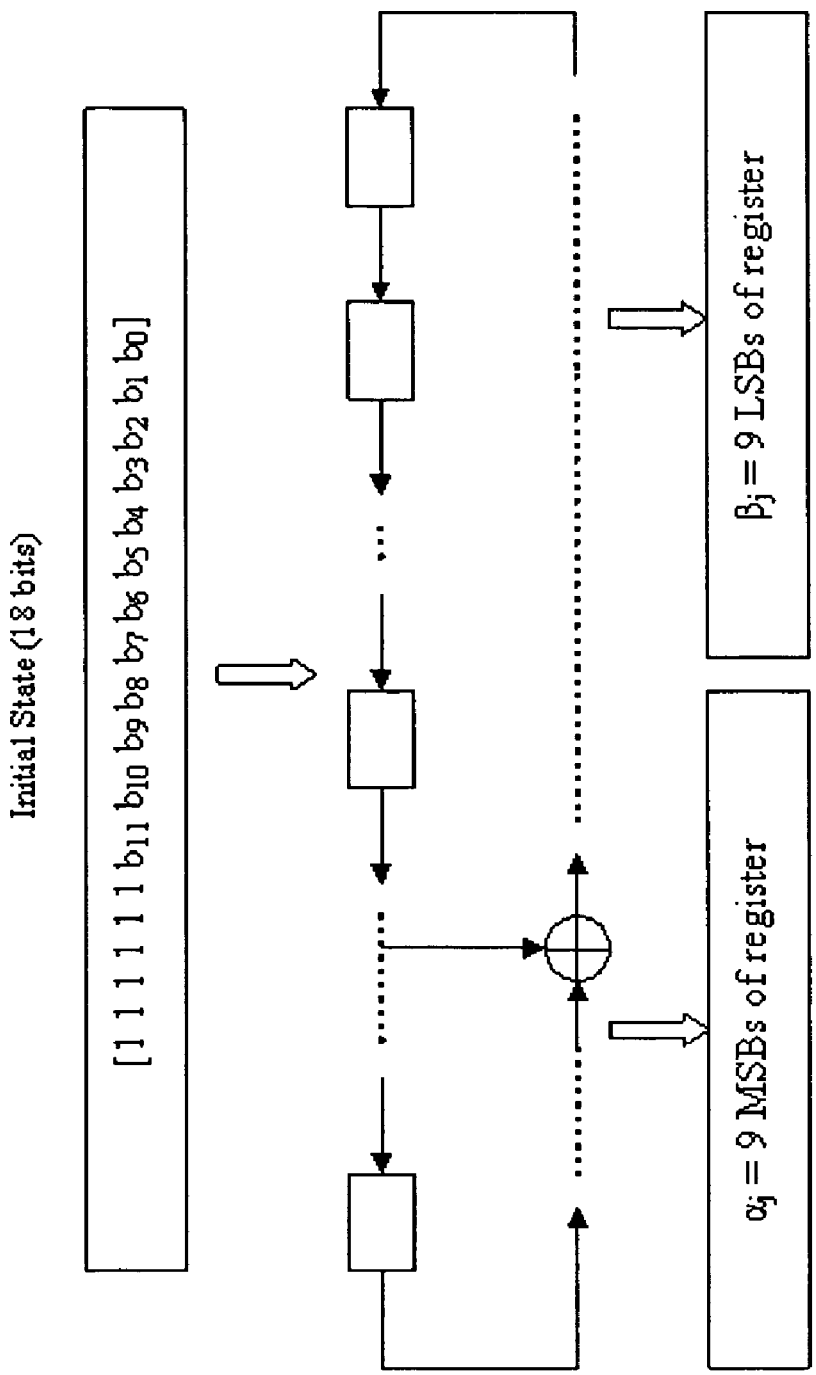
FIG. 6 shows one embodiment for Generating HijSECTOR(.) when FLIntraCellHopping is Off.

Referring to FIG. 6, the initial permutations Pki(.) are generated according to the following procedure:
  (1) Find the smallest integer n such that NFFT≦2n. Set |L|=n/2 if n is even and (n−1)/2 if n is odd.
  (2) Set the Feistel seeds S1, S2 and S3 as follows:
  (3) Find S'=[Boff.*2654435761] mod 232. Set S to be the bit-reversed value of S' in a 32-bit representation.
  (4) Set S1 to be the |L| LSBs of S, S2 to be the second |L| LSBs of S, and S3 to be the third |L| LSBs of S. In other words, S1=S mod 2|L|, S2=(S−S1)/2|L| mod 2|L| and S3=(S−S1−S22|L|)/22|L| mod 2|L|.
  (5) Initialize K counters y0, y1, . . . , yK−1 to zero. Initialize another counter x to zero.
  (6) Find the output π(x) of the Feistel network seeded with S1, S2 and S3.
  (7) If π(x) corresponds to a hop port in the kth port set (i.e., if N0+N1+ . . . +Nk−1≦π(x)<N0+N1+ . . . Nk−1+Nk) then
  (8) Set Pki(yk)=π(x)−(N0+N1+ . . . +Nk−1) and
  (9) Increment yk by ~1.
  (10) Increment the counter x by 1. If x<NFFT, repeat steps 4 through 6, else stop.

When the FLIntraCellCommonHopping is On, the K intra-portset permutations Pkij(.) that make up HijSECTOR(.) may be generated from initial permutations Pki(.) according to the procedure Pkij(x)=Pki(αj+Pki (βj+x)), where both the additions are performed modulo Nk. αj and βj are 9-bit random numbers generated using a PN-register with generator polynomial h(D)=D18+D11+1. The numbers αj and βj are generated as follows:
  1. The SECTOR_PN_OFFSET is XORed bitwise with the 12 LSBs of the superframe index i to obtain a 12-bit number [b11 b10 b9 b8 b7 b6 b5 b4 b3 b2 b1 b0] denoted as Boff.
  2. The PN-register is initialized to [111111 b11 b10 b9 b8 i7 i6 i5 b4 b3 b2 b1 b0] at the beginning of the superframe where i7 i6 i5 are the 7th, 6th and 5th bits of the superframe index i. The 12-bit number [b11 b10 b9 b8 i7 i6 i5 b4 b3 b2 b1 b0] is denoted as Bon.
  3. The register is then clocked 18 times every OFDM symbol. The contents of the register before OFDM symbol j determine αj and βj, with αj being set to the 9 MSBs of the register and βj being set to the 9 LSBs of the register. (Thus α0=[111111 b11 b10 b9] and β0=[b8 i7 i6 i5 b4 b3 b2 b1 b0]).

When the FLIntraCellCommonHopping is on, initial permutations Pki(.) for all portsets except the portset with index 0 are generated based on Bon, while the initial permutation for portset index 0 is generated based on Boff. To make proper use of this mode, the SECTOR_PN_OFFSET for two sectors of the same cell may differ in three bit locations, namely the bits with indices 5, 6 and 7. Here, bit index 0 corresponds to the MSB while bit index 11 corresponds to the LSB.

The procedure for generating the initial permutations for all portsets except the one with index 0 is as follows:
  1. Find the smallest integer n such that NFFT≦2n. Set |L|=n/2 if n is even and (n−1)/2 if n is odd.
  2. Set the Feistel seeds S1, S2 and S3 as follows:
  3. Find S'=[Bon*2654435761] mod 232. Set S to be the bit-reversed value of S' in a 32-bit representation.
  4. Set S1 to be the |L| LSBs of S, S2 to be the second |L| LSBs of S, and S3 to be the third |L| LSBs of S. In other words, S1=S mod 2|L|, S2=(S−S1)/2|L| mod 2|L| and S3=(S−S1−S22|L|)/22|L| mod 2|L|.
  5. Initialize K counters y0, y1, . . . , yK−1 to zero. Initialize another counter x to zero.
  6. Find the output π(x) of the Feistel network seeded with S1, S2 and S3.
  7. If π(x) corresponds to a hop port in the kth port set (i.e., if N0+N1+ . . . +Nk−1≦π(x)<N0+N1+ . . . Nk−1+Nk) for k>0, then:
  8. Set Pki(yk)=π(x)−(N0+N1+ . . . +Nk−1) and
  9. Increment yk by 1.
  10. Increment the counter x by 1. If x<NFFT, repeat steps 4 through 6, else stop.
  11. The initial permutation for portset index 0 is generated as follows:
  12. Find the smallest integer n such that (NFFT−NGUARD)≦2n. Set |L|=n/2 if n is even and (n−1)/2 if n is odd.
  13. Set the Feistel seeds S1, S2 and S3 as follows:
  14. Find S'=[Boff*2654435761] mod 232. Set S to be the bit-reversed value of S' in a 32-bit representation.
  15. Set S1 to be the |L| LSBs of S, S2 to be the second |L| LSBs of S, and S3 to be the third |L| LSBs of S. In other words, S1=S mod 2|L|, S2=(S−S1)/2|L| mod 2|L| and S3=(S−S1−S22|L|)/22|L| mod 2|L|.
  16. Initialize two counters x and y to zero.
  17. Find the output π(x) of the Feistel network seeded with S1, S2 and S3.
  18. If π(x) corresponds to a hop port in the 0th port set (i.e., if π(x)<N0):
  19. Set P0i(y)=π(x) and
  20. Increment y by 1.

21. Increment the counter x by 1. If x<NFFT, repeat steps 4 through 6, else stop.

The Common Pilot Channel (F-CPICH) may occupy an evenly spaced set of sub-carriers in every modulation symbol of every PHY Frame. Let Np be the nominal number of pilot sub-carriers in each OFDM symbol. Np is given by the "Number of Pilots" field of the "SystemInfo" block, which is public data of the Overhead Messages Protocol. The spacing between neighboring pilot sub-carriers may then be equal to Dp=NFFT/Np.

For each symbol in a PHY Frame, a variable Offsetp taking values between 0 and Dp−1 may be determined using the following procedure: Let i be the superframe index and let j be the index of the OFDM symbol within the superframe (starting with index 0). The variable Offsetp is not defined if j<=4, i.e., if the symbol is in the superframe preamble.

If j is odd, Offsetp may be determined using a 13-bit PN-register with generator polynomial h(D)=D13+D12+D11+D8+1. The shift-register may be initialized to the state [1 p11 p10 p9 p8 p7 p6 p5 p4 p3 p2 p1 p0] before the beginning of the superframe, where p11, p10, p9, . . . , p0 are the 12 bits of the SECTOR_PN_PHASE, with p11 being the MSB and p0 being the LSB. The shift-register maybe clocked 13 times every symbol. Offsetp may be chosen to be the value of the register modulo Dp. Here, the value of the register is the value before Symbol j, i.e., the value of the register after it has been clocked j*13 times.

If j is even, the value of Offsetp may be computed by adding the value Dp/2 to the value of Offsetp for the previous OFDM symbol modulo Dp. For each symbol in a PHY Frame, the subcarrier with index isc may be occupied by the F-CPICH if the following two conditions are satisfied: isc mod NFFT=Offsetp and the subcarrier with index isc is not a guard subcarrier.

Each subcarrier occupied by the F-CPICH may be modulated with the complex value ($\sqrt{P}$, 0), where P is the ratio of the power spectral density of the F-CPICH to the power spectral density of the second symbol in the F-ACQCH. This ratio is given by the "CommonPilotPower" field of the Systeminfo block, which may be public data of the Overhead Messages Protocol.

According to one embodiment, reverse link may implement block hopping, i.e., the set of hop-ports is divided into blocks of NBLOCK hop-ports, which may be in a contiguous manner. Hop-ports 0, 1, . . . , NBLOCK−1 form Block 0, hop-ports NBLOCK, NBLOCK+1, . . . , 2NBLOCK−1 form Block 1, etc. Consecutive hop-ports in a block are mapped by the hopping pattern to consecutive subcarriers, i.e., if hop-port 0 is mapped to subcarrier i, then hop-port 1 is mapped to sub-carrier i+1, hop-port 2 is mapped to subcarrier i+2, etc. The value of NBLOCK may be 8 for the Long Data Segment and TBD for the Short Data Segment. The hopping sequence may be described separately for the Long and Short Data Segments.

The number of guard carriers NGUARD may be an integer multiple of NBLOCK. As mentioned previously, the hop-ports indexed from NFFT−NGUARD to NFFT−1 may be mapped to the set of guard carriers by the hop permutation. The individual elements of this mapping are not specified since these carriers are not modulated. The hopping sequence may be described as a mapping from the set of hop-ports numbered 0 to NFFT−NGUARD−1 to the set of usable sub-carriers (i.e., all but the set of guard subcarriers).

The basic element in the generation of the hopping sequence may be a Feistel network. A three-stage Feistel network generates pseudo-random permutations of sizes which are powers of 2. A Feistel network which generates a permutation π(x) of {0, 1, 2, . . . , 2n−2, 2n−1} operates as follows:

1. The n-bit input x is split into two parts (L,R) with each part containing roughly the same number of bits. If n is even, L may be the n/2 MSBs of x, and R may be the n/2 LSBs. If n is odd, L may be the (n−1)/2 MSBs of x and R may be the (n+1)/2 LSBs of x.
2. The output π1(x) of the first stage of the Feistel network is an n-bit quantity of the form (R, L ⊕ f(R)). Here f(R)= (R+S1) mod 2|L| where |L| is the number of bits in L, S1 is an |L|-bit seed and ⊕ is a bit-by-bit XOR operation.
3. The output π1(x) is fed to the next stage of the Feistel network, which is identical to the first stage except the seed used is S2. The output π2(π1(x)) of the second stage is fed to the third stage, which is identical to the first two stages, except that the seed used is S3. The output π3(π2(π1(x))) of the third stage is the final output π(x).

FIG. 4 shows a three-stage Feistel network and FIG. 5 shows a single Feistel stage for the case n=9. The Long Data Segment supports constrained hopping. The channel tree may define a set of nodes to be constraint nodes, and the hopping sequence ensures that the set of all hop-ports that are part of a constraint node are mapped to a contiguous set of subcarriers. The consecutive hop-ports may or may not be mapped to consecutive subcarriers.

In order to support constrained hopping, the following restrictions are placed on the channel tree:
  (1) The constraint nodes may satisfy the following requirements:
    a. There may be at least two constraint nodes.
    b. The sub-graph comprising of the constraint nodes and their ancestors may be a binary tree.
  (2) Any base node may have one and only one constraint node as an ancestor.
  (3) All nodes in a port-set may have a common ancestor, and the port-set may be the set of all descendants of this ancestor.

A port-set that may have more than constraint node as descendant may be split into sub-portsets with each constraint node defining the sub-portset. The sub-portsets may be numbered {0, 1, . . . , K−1} in ascending order i.e., sub-portset 0 may contain the lowest numbered hop ports and sub-portset K−1 may contain the highest numbered hop ports.

Figure 7:
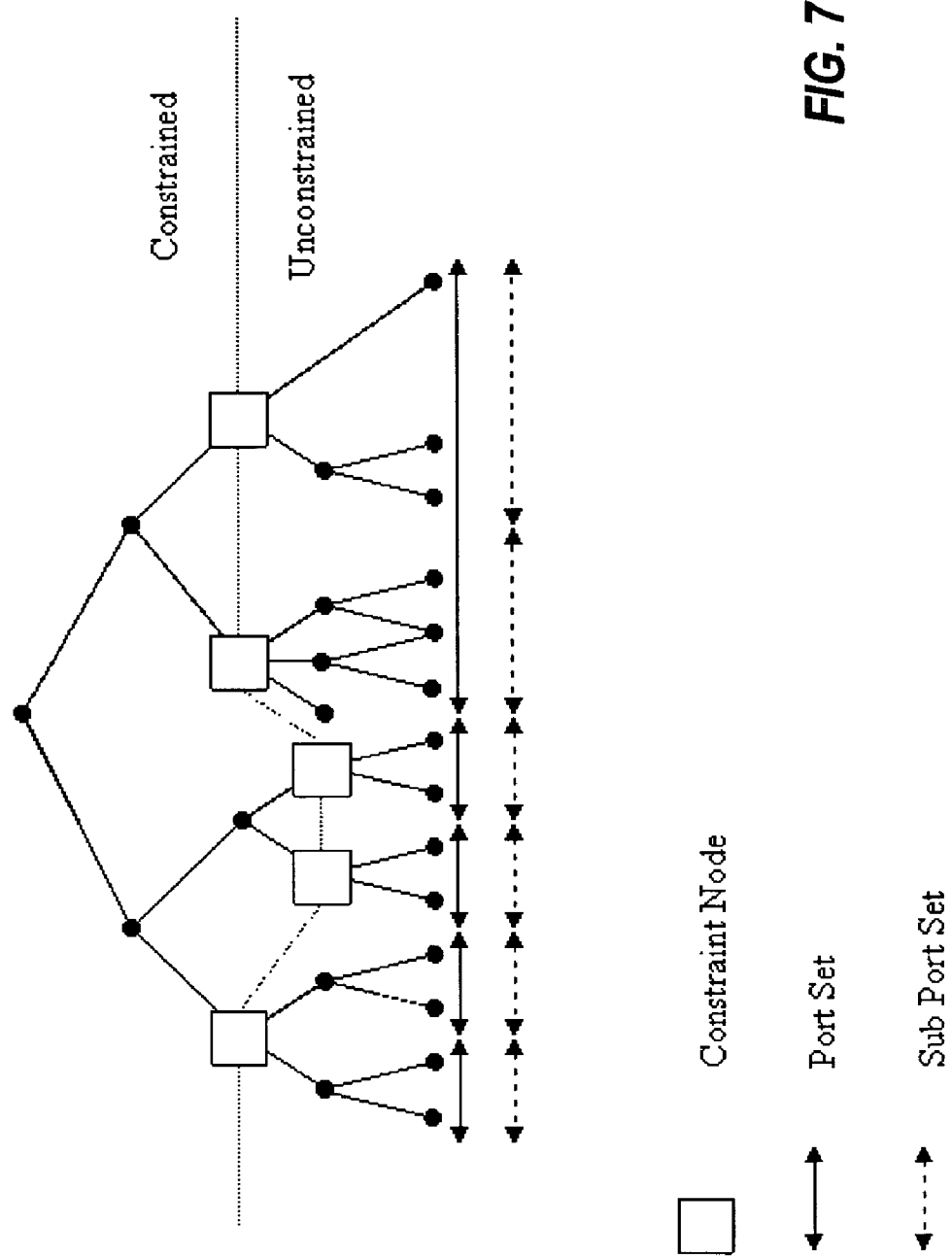
FIG. 7 shows one embodiment for Channel Tree with Portsets, Constraint Nodes and Sub-portsets.

Referring to FIG. 7, a channel tree with port-sets, constraint nodes and sub-portsets is depicted. Let Hij'(p') denote the frequency allocated to hop port p' in the modulation symbol numbered j' in superframe I, where j' is constrained to lie in a Long Data Segment. Here, p' is an index between 0 and NFFT−NGUARD−1 and Hij'(p') is a value between NGUARD/2 and NFFT−NGUARD/2−1, and it may be computed according to the following equation: Hij'(p')= NGUARD/2+NBLOCK*(HijGLOBAL(k)+HijkSECTOR (p))+(p' mod NBLOCK).

Here p=$\lfloor p'/N_{BLOCK} \rfloor$ denotes the hop-port block which contains hop port p', k denotes the sub-portset which contains the hop-port p', and j denotes the hop-interval index within the superframe corresponding to symbol j'. The hop-interval index is counted sequentially within a superframe while ignoring the Control Segment, i.e., hop-intervals 0 and 1 belong to the first frame in the superframe, hop-intervals 2 and 3 belong to the 2nd frame in the superframe, etc. HijkSECTOR(.) is a sector-dependent function that permutes hop port blocks within the kth sub-portset. HijGLOBAL(k) is a function that permutes the sub-portsets around in frequency (either on a sector-by-sector basis or on a sector-independent basis).

The generation of HijSECTOR may be described separately for different values of RLIntraCellCommonHopping. First, there is when RLIntraCellCommonHopping is off. In this case, Let K be the total number of sub-portsets and Nk be the number of hop-port blocks (excluding hop-port blocks in the guard region) in the kth sub-portset. The number of hop port blocks is the number of hop ports divided by NBLOCK. The SECTOR_PN_OFFSET of the sector of interest is XORed bitwise with the 12 LSBs of the superframe index i to obtain a 12-bit number [b11 b10 b9 b8 b7 b6 b5 b4 b3 b2 b1 b0] denoted as Boff. This may be used to generate the permutations HijkSECTOR(.) according to the following procedure:

(1) Find the smallest integer n such that NFFT≦2n. Set |L|=n/2 if n is even and (n−1)/2 if n is odd.

(2) Set the Feistel seeds S1, S2 and S3 as follows:

(3) Find S'=[(Boff*32+j)*2654435761] mod 232. Set S to be the bit-reversed value of S' in a 32-bit representation. Set S1 to be the |L| LSBs of S, S2 to be the second |L| LSBs of S, and S3 to be the third |L| LSBs of S. In other words, S1=S mod 2|L|, S2=(S−S1)/2|L| mod 2|L| and S3=(S−S1−S2|L|)/2|L| mod 2|L|.

Initialize a counter x to 0. Initialize K counters y0, y1, y2, . . . ,yK−1 to 0, N0, N0+N1, N0+N1+N2, . . . , N0+N1+ . . . +NK−2 respectively. (These initial values correspond to the lowest numbered hop port blocks in that sub-portset)

Find the output π(x) of the Feistel network seeded with S1, S2 and S3.

If π(x) corresponds to a hop port block in the kth sub-portset, i.e., if N0+N1+ . . . +Nk−1≦π(x)<N0+N1+ . . . +Nk,
Set HijkSECTOR(yk)=π(x) and
Increment yk by 1.
Increment the counter x by 1. If x<NFFT, repeat steps 4 through 6, else stop.

RLIntraCellCommonHopping is On

Let K be the total number of sub-portsets and Nk be the number of hop-port blocks in the kth sub-portset, excluding hop-port blocks in the guard region. The number of hop-port blocks is the number of hop-ports divided by NBLOCK.

The PN-offset of the sector is XORed bitwise with the 12 LSBs of the superframe index i to obtain a 12-bit number [b11 b10 b9 b8 b7 b6 b5 b4 b3 b2 b1 b0] denoted as Boff. The 12-bit number [b11 b10 b9 b8 i7 i6 i5 b4 b3 b2 b1 b0], where i7 i6 i5 are the 7th, 6th and 5th bits of the superframe index i, is denoted as Bon.

When RLIntraCellCommonHopping is on, Bon may be used to generate the permutations HijkSECTOR(.) of sub-portsets that are not part of port-set 0, while Boff may be used to generate the permutations HijkSECTOR(.) of sub-portsets that are part of port-set 0. The SECTOR_PN_OFFSET for two sectors of the same cell may differ in three bit locations, namely the bits with indices 5, 6 and 7. Here, bit index 0 corresponds to the MSB while bit index 11 corresponds to the LSB.

For sub-portsets that are not part of port-set 0, HijkSECTOR(.) may be generated according to the following procedure:

Find the smallest integer n such that NFFT≦2n. Set |L|=n/2 if n is even and (n−1)/2 if n is odd.

Set the Feistel seeds S1, S2 and S3 as follows:

Find S'=[(Bon*32+j)*2654435761] mod 232. Set S to be the bit-reversed value of S' in a 32-bit representation.

Set S1 to be the |L| LSBs of S, S2 to be the second |L| LSBs of S, and S3 to be the third |L| LSBs of S. In other words, S1=S mod 2|L|, S2=(S−S1)/2|L|mod 2|L| and S3=(S−S1−S2|L|)/2|L| mod 2|L|.

Initialize a counter x to 0. Initialize K counters y0, y1, y2, . . . ,yK−1 to 0, N0, N0+N1, N0+N1+N2, . . . , N0+N1+ . . . +NK−2 respectively. These initial values correspond to the lowest numbered hop port blocks in that sub-portset.

Find the output π(x) of the Feistel network seeded with S1, S2 and S3.

If π(x) corresponds to a hop port block in the kth sub-portset, (i.e., if N0+N1+ . . . +Nk−1≦π(x)<N0+N1+ . . . +Nk) and the kth sub-portset is a part of portset 0,
Set HijkSECTOR(yk)=π(x) and
Increment yk by 1.
Increment the counter x by 1. If x<NFFT, repeat steps 4 through 6, else stop.

For sub-portsets that are part of port-set 0, HijkSECTOR(.) may be generated according to the following procedure:

Find the smallest integer n such that NFFT≦2n. Set |L|=n/2 if n is even and (n−1)/2 if n is odd.

Set the Feistel seeds S1, S2 and S3 as follows:

Find S'=[(Boff*32+j)*2654435761] mod 232. Set S to be the bit-reversed value of S' in a 32-bit representation.

Set S1 to be the |L| LSBs of S, S2 to be the second |L| LSBs of S, and S3 to be the third |L| LSBs of S. In other words, S1=S mod 2|L|, S2=(S−S1)/2|L|mod 2|L| and S3=(S−S1−S2|L|)/22|L| mod 2|L|.

Initialize a counter x to 0. Initialize K counters y0, y1, y2, . . . ,yK−1 to 0, N0, N0+N1, N0+N1+N2, . . . , N0+N1+ . . . +NK−2 respectively. (These initial values correspond to the lowest numbered hop-port blocks in that sub-portset)

Find the output π(x) of the Feistel network seeded with S1, S2 and S3.

If π(x) corresponds to a hop port block in the kth sub-portset, (i.e., if N0+N1+ . . . +Nk−1≦π(x)<N0+N1+ . . . +Nk) and the kth sub-portset is a part of the 111-portset
Set HijkSECTOR(yk)=π(x) and
Increment yk by 1.
Increment the counter x by 1. If x<NFFT, repeat steps 4 through 6, else stop.

Generation of HijGLOBAL(.)

The HijGLOBAL(k) may permute the K sub-portsets in a manner that increases frequency diversity with little or no loss in interference diversity. This may be done according to the following procedure:

Generate a seed S according to the following rule:

If there is more than one port set, then S'=[(RLSectorHopSeed*4096*32+(i mod 4096)*32+j)*2654435761] mod 232

If there is only one port set then S'=[(Boff*32+j)*2654435761] mod 232

S is the bit-reversed value of S' in a 32-bit representation.

The two depth-1 nodes (i.e., children of the root node) may be labeled A and B, and KA may be the number of sub-portsets that are descendants of A, and KB may be the number of sub-portsets that are descendants of B. (KA+KB=K).

The permutations on {0, 1, . . . , KA−1} may be listed in alphabetical order and numbered 0 to (KA!−1), where k! denotes the product k(k−1)(k−2) . . . 2 for any positive integer k. For example if KA=3, then the ordering is 012, 021, 102, 120, 201, 210 with the numbering going from 0 to 5. The permutation numbered ⌊S/2⌋modK$_A$! may be chosen to be the permutation PA of the sub-portsets which are descendants of A.

Similarly, the permutations on {KA, KA+1, . . . , KA+KB−1} may be listed in alphabetical order and numbered 0 to (KB!−1). For example, if KA=3 and KA=2, then the permutations are 34 and 43, numbered 0 and 1 respectively. The permutation numbered ⌊S/2⌋ mod K$_B$! may be chosen to be the permutation PB of the sub-portsets which are descendants of B.

A permutation on the set {A,B} is determined as follows:

If j is even, the permutation may be AB if S mod 2=0 and BA if S mod 2=1.

If j is odd, the permutation may be the opposite of the permutation chosen at hop-interval j−1.

The overall permutation on the sub-portsets may be PAPB or PBPA accordingly. For example, if PA=021 and PB=43, and AB was chosen, then the overall permutation may be 02143. If BA was chosen, it would have been 43021.

Once the permutation of sub-portsets is finalized, the function HijGLOBAL(k) may be computed by subtracting the location for the lowest numbered hop-port block in that sub-portset before permuting from the location of the same hop-port block after permutation. For example, if the sub-portset permutation is 02143, then HijGLOBAL(0)=(0)−(0).
HijGLOBAL(1)=(N0+N2)−(N0).
HijGLOBAL(2)=(N0)−(N0+N1).
HijGLOBAL(3)=(N0+N2+N1+N4)−(N0+N1+N2).
HijGLOBAL(4)=(N0+N2+N1)−(N0+N1+N2+N3).

where Nk is the number of hop port blocks in the kth sub-portset

In one embodiment, a system and method for generating random hopping patterns includes determining a first number of sub-carriers and a second number of hop ports. The number of hop ports may be less than the number of sub-carriers due to guard bands, which consumes some sub-carriers. The process may also include determining a third number of seeds as described above. The process generates at least one hopping pattern based on the first number of sub-carriers, the second number of hop ports, and the third number of seeds, e.g., using the Feistel network, as described above. The seeds may be determined based on a system time, a sector ID, a cell ID, or a combination thereof.

In one embodiment, the generated hop pattern may be updated or changed frequently to ensure frequency diversity. The update may be based on a factor of system time. The update may also include changing the sub-carrier frequency of a hop port entity by a predetermined amount every predetermined time period.

In one embodiment, the hop ports may be grouped into smaller groups of hop ports, and each group fed into a portion/unit of the Feistel network, thereby generating at least one hopping pattern for each smaller group of hop ports. In this case, each group of sub-carriers may correspond to different sectors in the same or different cells, and may experience lower interference.

In one embodiment, a block (e.g., contiguous) of the hop ports may be assigned to a user. In order to facilitate channel estimation, for example, the generated hopping pattern for the block of hop ports may comprise nearby frequency sub-carriers and/or contiguous frequency sub-carriers.

In one embodiment, a plurality of blocks of the hop ports may be assigned to a user. The corresponding hopping patterns for the blocks of hop ports may be placed at desired proximity. To ensure frequency diversity and lower interference, for example, the hopping patterns for the blocks of hop ports may be made apart from each other. However, if the hopping patterns for the blocks of hop ports are too far from each other, out of band spectral emission may increase.

In one embodiment, a method for generating random hopping patterns for a plurality of hop ports includes ordering the hop port entities (hop port and/or blocks of hop ports) in sequence at the first layer (leaves) of a tree, and swapping each pair of hop port entities at a lower layer if at least a first condition is met, thereby generating a higher layer of hop port entities. The process repeats this act and swaps each pair of hop port entities at the higher layer if at least a second condition is met. This process is repeated until one reaches the top of the tree and a random hopping pattern is generated. The hop port entities may comprise at least one block of contiguous hop ports, which may correspond to a contiguous block of sub-carrier frequencies.

For example, consider a set of hop port entities numbered 0, 1, 2, and 3. At the lowest layer, hop port pairs 0-1 and 2-3 are present. If a first condition, e.g., tossing a coin for head, is met for a pair, the pair is swapped. For instance, pair 0-1 may not swap, but pair 2-3 may swap, resulting in a higher layer hop port entities 0-1 and 3-2. Now, repeating the process, the higher layer pair (0-1 and 3-2) is swapped if a second or the same condition is met. For instance, the higher layer pair may swap, resulting in the hopping pattern 3, 2, 0, and 1. It should be noted that any number of hop ports entities having any number of hop ports may be included in this process.

The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

The signaling transmission techniques described herein may be implemented by various means. For example, these techniques may be implemented in hardware, software, or a combination thereof. For a hardware implementation, the processing units used to process (e.g., compress and encode) signaling may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to decode and decompress the signaling may also be implemented with one or more ASICs, DSPs, and so on.

For a software implementation, the signaling transmission techniques may be implemented with modules (e.g., procedures, functions, and so on) that perform the functions described herein. The software codes may be stored in a memory unit (e.g., memory unit 252 or 292 in FIG. 2) and executed by a processor (e.g., controller 250 or 290). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for generating random hopping patterns, comprising:
   determining a first number of sub-carriers;
   determining a second number of hop ports;
   determining a third number of seeds;
   generating at least one hopping pattern based on the first number of sub-carriers, the second number of hop ports, and the third number of seeds wherein the hopping pattern is generated using a Feistel Network and
   transmitting a signal with a transmitter unit according to the hopping pattern.

2. The method of claim 1, wherein at least one of the third number of seeds is determined based on system time.

3. The method of claim 1, wherein at least one of the third number of seeds is determined based a sector ID.

4. The method of claim 1, wherein at least one of the third number of seeds is determined based on a cell ID.

5. The method of claim 1, wherein the first number and the second number are different.

6. The method of claim 1, further comprising changing the hopping pattern frequently.

7. The method of claim 1, further comprising: grouping the second number of hop ports into smaller groups of hop ports: and generating at least one hopping pattern for each smaller group of hop ports, such that the hopping pattern for the small groups are disjoint.

8. The method of claim 1, further comprising: assigning a block of the second number of hop ports to a user; and generating at least one hopping pattern for the block of hop ports, such that (he hopping pattern for the block of hop ports comprises nearby frequency sub-carriers.

9. The method of claim 8, wherein the hopping pattern for the block of hop ports comprises contiguous frequency sub-carriers.

10. The method of claim 1, further comprising: assigning a plurality of blocks of the second number of hop ports to a user; and generating at least one hopping pattern for each block of hop ports, such that the hopping patterns comprise nearby frequency sub-carriers.

11. The method of claim 10, wherein the hopping pattern for at least one block of hop ports comprises contiguous frequency sub-carriers.

12. At least one processor programmed to execute a method for generating random hopping patterns, the method comprising:
determining a first number of sub-carriers;
determining a second number of hop ports;
determining a third number of seeds; and generating at least one hopping pattern based on the first number of sub-carriers, the second number of hop ports, and the third number of seeds wherein the hopping pattern is itenerated using a Feistel Network.

13. The processor of claim 12, wherein at least one of the third number of seeds is determined based on system time.

14. The processor of claim 12, wherein at least one of the third number of seeds is determined based a sector ID.

15. The processor of claim 12, wherein at least one of the third number of seeds is determined based on a cell ID).

16. The processor of claim 12, wherein the first number and the second number are different.

17. The processor of claim 12, the method further comprising changing the hopping pattern frequently.

18. The processor of claim 12, the method further comprising: grouping the second number of hop ports into smaller groups of hop ports; and generating at least one hopping pattern for each smaller group of hop ports, such that the hopping pattern for the small groups are disjoint.

19. The processor of claim 12, the method further comprising: assigning a block of the second number of hop ports to a user; and generating at least one hopping pattern for the block of hop ports, such that the hopping pattern for the block of hop ports comprises nearby frequency sub-carriers.

20. The processor of claim 17, wherein the hopping pattern for the block of hop ports comprises contiguous frequency sub-carriers.

21. The processor of claim 12, the method further comprising: assigning a plurality of blocks of the second number of hop ports to a user; and generating at least one hopping pattern for each block of hop ports, such that the hopping patterns comprise nearby frequency sub-carriers.

22. The processor of claim 21, wherein the hopping pattern for at least one block of hop ports comprises contiguous frequency sub-carriers.

23. An apparatus for generating random hopping patterns, comprising:
means for determining a first number of sub-carriers; a second number of hop ports; and a third number of seeds; and
means for generating at least one hopping pattern with a plurality of Feistel Stages, the plurality of Feistel stages using the first number of sub-carriers, the second number of hop ports, and the third number of seeds.

24. The apparatus of claim 23, further comprising means for determining at least one of the third number of seeds based on system time.

25. The apparatus of claim 23, further comprising means for determining at least one of the third number of seeds based a sector ID.

26. The apparatus of claim 23, further comprising means for determining at least one of the third number of seeds based on a cell ID.

27. The apparatus of claim 23, wherein the first number and the second number are different.

28. The apparatus of claim 23, further comprising means for changing the hopping pattern frequently.

29. The apparatus of claim 23, further comprising: means for grouping the second number of hop ports into smaller groups of hop ports; and means for generating at least one hopping pattern for each smaller group of hop ports, such that the hopping pattern for the small groups are disjoint.

30. The apparatus of claim 23, Further comprising: means for assigning a block of the second number of hop ports to a user; and means for generating at least one hopping pattern for the block of hop ports, such that the hopping pattern for the block of hop ports comprises nearby frequency sub-carriers.

31. The apparatus of claim 30, wherein the hopping pattern for the block of hop ports comprises contiguous frequency sub-carriers.

32. The apparatus of claim 23, further comprising: means for assigning a plurality of blocks of the second number of hop ports to a user; and means for generating at least one hopping pattern for each block of hop ports, such that the hopping patterns comprise nearby frequency sub-carriers.

33. The apparatus of claim 32, wherein the hopping pattern Fur at least one block of hop ports comprises contiguous frequency sub-carriers.

34. A computer-readable medium embodying a computer program executable by processor for implementing a method for generating random hopping patterns, the method comprising:
determining a first number of sub-carriers;
determining a second number of hop ports;
determining a third number of seeds; and
generating at least one hopping pattern based on the first number of sub-carriers, the second number of hop ports, and the third number of seeds wherein the hopping pattern is generated using a Feistel Network.

* * * * *